United States Patent
Walkup

Patent Number: 5,725,230
Date of Patent: Mar. 10, 1998

[54] SELF STEERING TANDEM HITCH

[76] Inventor: Joseph L. Walkup, Rural Rte. 1 Box 112, Stoutsville, Mo. 65283

[21] Appl. No.: 665,335

[22] Filed: Jun. 17, 1996

[51] Int. Cl.$^6$ ................................................ B62D 13/00
[52] U.S. Cl. ............................................................ 280/442
[58] Field of Search ................................ 280/416.1, 416.2, 280/416.3, 419, 433, 441, 442, 453, 426, 432, 445

[56] References Cited

U.S. PATENT DOCUMENTS

| | | | |
|---|---|---|---|
| 1,012,220 | 12/1911 | Pearson. | |
| 1,877,650 | 9/1932 | Eakin | 280/412 |
| 2,994,143 | 9/1961 | Kenney | 37/155 |
| 3,015,499 | 6/1962 | Van Der Lely | 280/456 |
| 3,043,034 | 5/1962 | Kober | 37/148 |
| 3,177,828 | 4/1965 | Cramer | 111/52 |
| 3,324,956 | 6/1967 | Richie | 172/356 |
| 3,454,285 | 7/1969 | Van Peursem | 280/468 |
| 4,033,426 | 7/1977 | Williams | 280/419 |
| 4,034,687 | 7/1977 | Van Der Lely | 111/13 |
| 4,415,174 | 11/1983 | Koehn | 280/411 |
| 4,445,706 | 5/1984 | Jarosek | 280/411 |
| 4,478,032 | 10/1984 | Inskeep | 56/377 |
| 4,720,119 | 1/1988 | Ritter | 280/419 |
| 5,244,226 | 9/1993 | Bergh | 280/442 |

*Primary Examiner*—Stephen Avila
*Attorney, Agent, or Firm*—Richard J. Grundstrom

[57] ABSTRACT

A tandem hitch that automatically steers a second implement so it will properly trail a first implement around corners. The hitch attaches to a tractor's three point hookup, so it is held stationary on the tractor. The first implement or attachment attaches to the back of the tractor. The second implement or implement attaches to the back of the self steering tandem hitch.

A first steering apparatus maintains the implement in a proper following position during cornering by rotating the rear wheel assembly. The whole wheel assembly is rotated by the steering apparatus for proper following positioning. Without the automatic steering the second implement would underswing or overswing leaving an area untouched. The steering action accomplished by this device steers the second implement to give a true and correct trailing of the second implement.

The self steering tandem hitch is generally described as having a front upright support, a main beam, a rear upright support, an axle assembly, a first steering apparatus and a second steering apparatus. The bottom end of the front upright support is attachable to a three point hitch on a tractor. The main beam is pivotally and rotatably attached to the top end of the front upright support. The rear upright support is attached to the rear end of the main beam. The axle assembly is rotatably attached to the lower end of rear upright support. The first steering apparatus rotates the wheel assembly in respect to the main beam to automatically steer the rear end of the self steering tandem hitch during turning and cornering. The rotation of the wheel assembly during turning and cornering maintains alignment of a second farm implement attached to the rear end of the self steering tandem hitch. A first farm implement being attached directly to the tractor. The second steering apparatus pivots the wheels to hold and maintain the second or rear farm implement in a left or right offset position.

18 Claims, 7 Drawing Sheets

SELF STEERING TANDEM HITCH

BACKGROUND OF THE INVENTION

The present invention relates to a self steering tandem hitch and more particularly to a tandem hitch that allows a tractor to pull two implements in which the rear implement automatically maintains alignment with the front implement during cornering and turning. This prevents over or under swing of the rear implement during turning and cornering.

Tandem hitches have been known and used in the farming industry for many years. These hitches allow a single tractor to pull two implements simultaneously. The first implement is generally attached directly to or directly behind the tractor. The implement can also be offset to the left or right. The second implement is attached to the rear of the tandem hitch apparatus. This allows the second implement to be pulled directly behind the first implement or in offset position.

As long as the tractor maintains a straight movement, the implements will maintain their position, one behind the other either directly in line or in an offset position. However, during cornering and turning the second implement will not follow the path of the first implement. The rear implement typically under swings when cornering. This under swing, or over swing in some situations, of the second implement will leave an area untouched by the implement. To work the untouched areas the farmer has to make additional passes.

The present invention steers the second implement in such a manner that there is true tracking or following of the second implement behind the first implement. This eliminates the under swing, or over swing, of the second implement to eliminate the untouched areas and the need for the farmer to make additional passes.

Accordingly, it is an object of the present invention to provide a self steering tandem hitch adapted to allow two implements to be attached and pulled simultaneously behind a single tractor.

Another object of the present invention is to provide a self steering tandem hitch that pulls the rear implement in true alignment behind the first implement during cornering and turning as well as during straight travel.

A further object of the present invention is to provide a self steering tandem hitch adapted to prevent over or under steering of a rear implement during turning and cornering.

Yet another objective is to provide a self steering tandem hitch that eliminates the need of a farmer to make additional passes to work the soil missed by under or over swing of a second implement being pulled in a tandem configuration. The present invention has been demonstrated to save a farmer time by eliminating the need of the additional passes.

SUMMARY OF THE INVENTION

To accomplish the foregoing and other objects of this invention there is provided a self steering tandem hitch and more particularly to a tandem hitch that allows a single tractor to pull two implements or other devices, where the second implement or device is steered such that it will properly track the first implement.

The self steering tandem hitch of this invention includes a tandem hitch that automatically steers the second implement so it will properly trail or follow the first implement around corners. The hitch attaches to a tractor's three point hookup, so it is held stationary on the tractor. The first implement attaches to the back of the tractor. The second implement or other device attaches to the back of the tandem hitch. A hydraulic cylinder steers the wheels on the back portion of the tandem hitch to position the implement or implement to the left or right of the first implement.

An automatic steering apparatus maintains the implement in a proper following position during cornering by rotating the rear wheel assembly. Note that the rear wheels are first turned on the wheel assembly for positioning to the left or right. Then the whole wheel assembly is rotated by the steering apparatus for proper following positioning and steering. This is two separate actions.

Steering is accomplished by a first fixed gear attached to the front support that is stationary in respect to the tractor. A second gear is attached to a rotatable support that rotates the rear wheel assembly. A steering linkage joins the two gears. As the tractor turns, the first fixed gear is turned with the tractor. It is being held stationary in respect to the tractor. The first fixed gear pulls the steering linkage as the tractor turns. This causes the steering linkage to rotate the second gear in a proper relationship to the first gear. The second gear is attached to the rotatable support which then rotates the wheel assembly. This steering action maintains the proper positioning of the second implement during turning or cornering. Without the automatic steering the second implement would swing out to far or under swing and leave an area untouched. The steering action accomplished by this device steers the second implement to give a true and correct trailing of the first implement.

These and other objects and features of the present invention will be better understood and appreciated from the following detailed description of the main embodiment thereof, selected for purposes of illustration and shown in the accompanying drawings.

DETAILED DESCRIPTION

Referring now to the drawings there is shown the preferred embodiments for the self steering tandem hitch 10 of this invention. The self steering tandem hitch of this invention allows two implements to be pulled by a single tractor. The implement could be any implement pulled behind a tractor. This could include rakes, plows, disks, blades, cultivators, planters, drag harrow, or any other implements pulled in tandem as described herein.

The self steering tandem hitch of this invention basically consists of a front upright support 12 attachable to the tractor, a main beam 14 extending rearward from the front upright support 12, a rear upright support 16 extending downward and supporting the rear of the main beam 14, a wheel and axle assembly 18 rotatably attached to the bottom of the rear upright support, a first steering apparatus 20 for rotating the wheel and axle assembly 18 in respect to the main beam 14, and a second steering apparatus 22 that pivots the wheels in respect to the axle.

This arrangement maintains the rear or second implement in a proper following position during cornering. The rear wheels 72 are first turned or pivoted in respect to the axle 68 on the wheel assembly 18 for positioning the implement to the left or right of the front or first implement. The whole wheel and axle assembly 18 is rotated by the first steering apparatus 20 for proper following positioning during pulling operations.

The preferred embodiment and the best mode contemplated of the self steering tandem hitch 10 of the present invention are herein described. However, it should be understood that the best mode for carrying out the invention hereinafter described is offered by way of illustration and not by the way of limitation. It is intended that the scope of the invention includes all modifications that incorporate its principle design features.

The front upright support 12, consists of several components. The front upright support 12 is attachable to the tractor using an attachment device 24. It is secured to and held stationary in respect to the tractor. In the preferred embodiment it will be attached to the tractor's three point hitch. Other quick connections known in the art could also be used without departing from the scope and spirit of the invention described herein. There are two embodiments of the attachment device 24 described herein. Other similar means could also be used to attach the self steering tandem hitch to the tractor.

Figure 5:
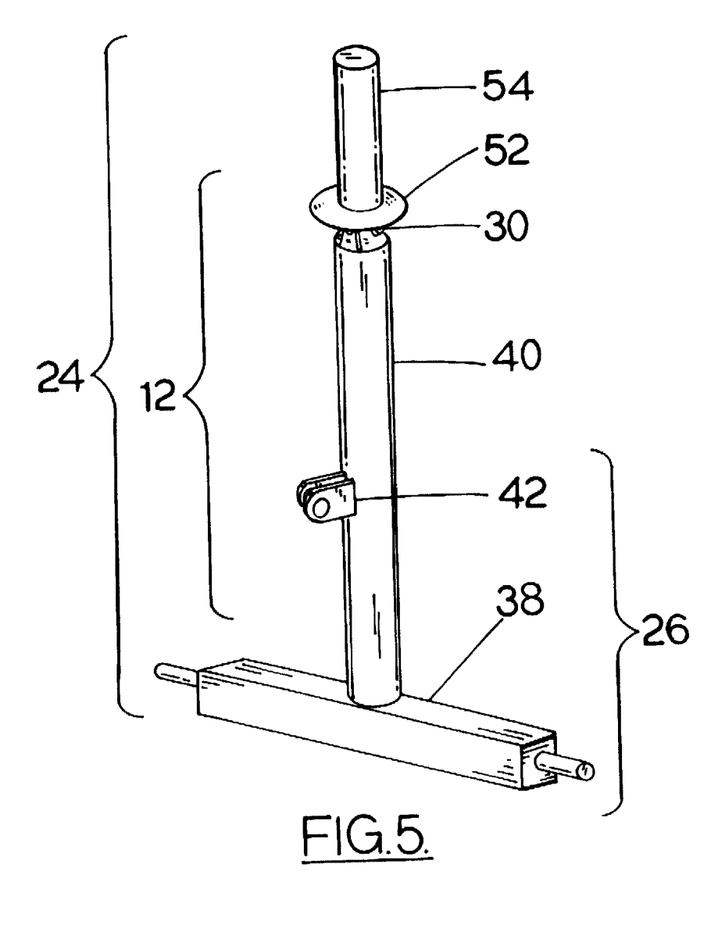
FIG. 5 is an isometric view of the inverted T hookup device with the first upright support shaft, front bottom twist plate and front shaft extending upward from the twist plate.

The first attachment device 24 can be described as an inverted T, 26. Illustrated in FIG. 5. The inverted T attachment device 26 is attached to a lower end of the first upright support 12 and adapted to attach the self steering tandem hitch 10 to a three point hitch on a tractor. The inverted T attachment device 26 is generally made from a horizontal member 38 and a first upright support shaft 40. The horizontal member 38 is attached to the draw bars on the tractor's three point hitch. A bracket 42 is attached to the first upright support shaft 40 for attachment of the turnbuckle of the three point hitch. Atop the first upright support shaft 40 is attached a pivot joint 30. Above the pivot joint 30, in all embodiments described herein, the first upright support remains the same.

The second attachment device 24 is an offset hookup device 28. The offset hookup device 28 provides a means of additional offset. The additional offset combined with the offset provided by pivoting the wheels in respect to the axle, allows the rear implement to be pulled in a far left to a far right position. This allows clearance for larger implements and a larger selection of offset positions.

The offset hookup device 28 consists of a frame member 30 that supports a top cross member 32. A typical configuration is illustrated in FIGS. 1 through 4. Other variations of the frame member could also be used. A multi-position receiver 34 is mounted on the top of the top cross member 32. The receiver 34 provides a sliding surface for a hook up plate 36. The hookup plate 36 slides across the top surface of the receiver 34 and is secured in a desired position. This position can be centered or offset to the left and right of center anywhere along the receiver 34. Typically, the hookup plate 36 will be bolted the receiver 34 at the desired location.

The hookup plate 36 is rigidly attached to the bottom end of the first upright support shaft 40. The pivot joint 30 is attached to the top of the first upright support shaft 40.

In one embodiment, the multi-position receiver 34 has a channel on which the hookup plate 36 may slide within. Illustrated in FIG. 1A. The hookup plate 36 is lockable at any position along the channel. The hookup plate is typically secured by bolts 44 or other means.

Figure 6:
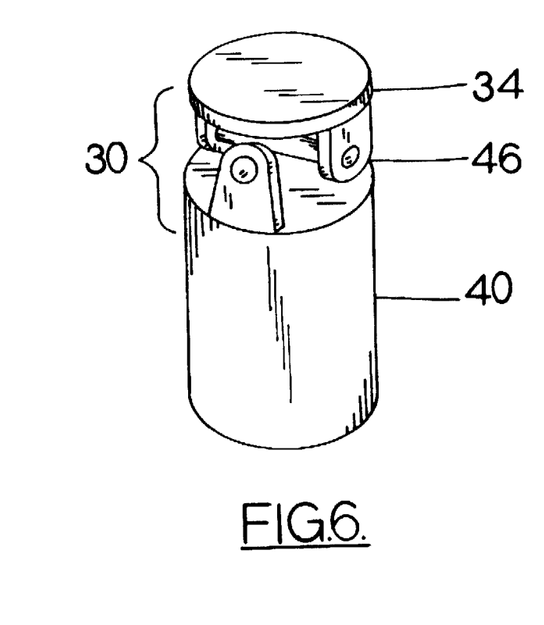
FIG. 6 is a representation of the pivot device atop the first upright support.

The pivot joint 30 provides the ability of the self steering tandem hitch 10 to flex longitudinally and laterally, in respect to the tractor, as the tractor negotiates uneven terrain. The pivot joint 30 is attached to the top end of the first upright support shaft 40. Typically, the pivot joint 30 is a standard universal joint. The pivot joint 30 can be described as having a first yoke 46, a pivot X member 48 and a second yoke 50. The first yoke 46 is rigidly attached to the top end of the first upright support 40. A first set of opposing arms of the pivot x member 48 are rotatably installed in the first yoke 46. A second set of opposing arms of the pivot X member 48 are rotabably installed in the second yoke 50. The second yoke 50 is rigidly attached to the bottom surface of a front bottom twist plate 52.

In the embodiment as illustrated there are four twist plates. Each of the twist plates will be separately referenced in this description. Each of the twist plates, in the preferred embodiment, is made of plate steel. They are typically round as shown. The twist plates in general provide a means of supporting the weight of the self steering tandem hitch and provides the ability of main beam 14 and wheel assembly 18 to pivot.

A front shaft 54 is attached to a center area of the top surface of the front bottom twist plate 52. The front shaft 54 is typically a round shaft having a top end and a bottom end. The shaft can be hollow or solid. The length of the shaft 54 is slightly greater than the height of the main beam 14. The front shaft 54 extends upward from the twist plate 52 in an inline parallel alignment with the first upright support 40. The pivot joint 30 allows the front shaft 54 to pivot left to right and forward to backward to the limits of the pivot joint 30.

A front top twist plate 56 sets upon the top surface of the front bottom twist plate 52. The front top twist plate 56 will have a center opening. The diameter of the opening will be slightly larger then the diameter of the front shaft 54. The front shaft 54 extends through the center opening on the front top twist plate. The bottom surface of the top front twist plate 56 rests and rotates upon the top surface of the front bottom twist plate 52.

The weight of the front of the self steering tandem hitch 10 less the weight of the attachment device 26 or 28 rests upon the top surface of the bottom front twist plate 52.

Figure 7:
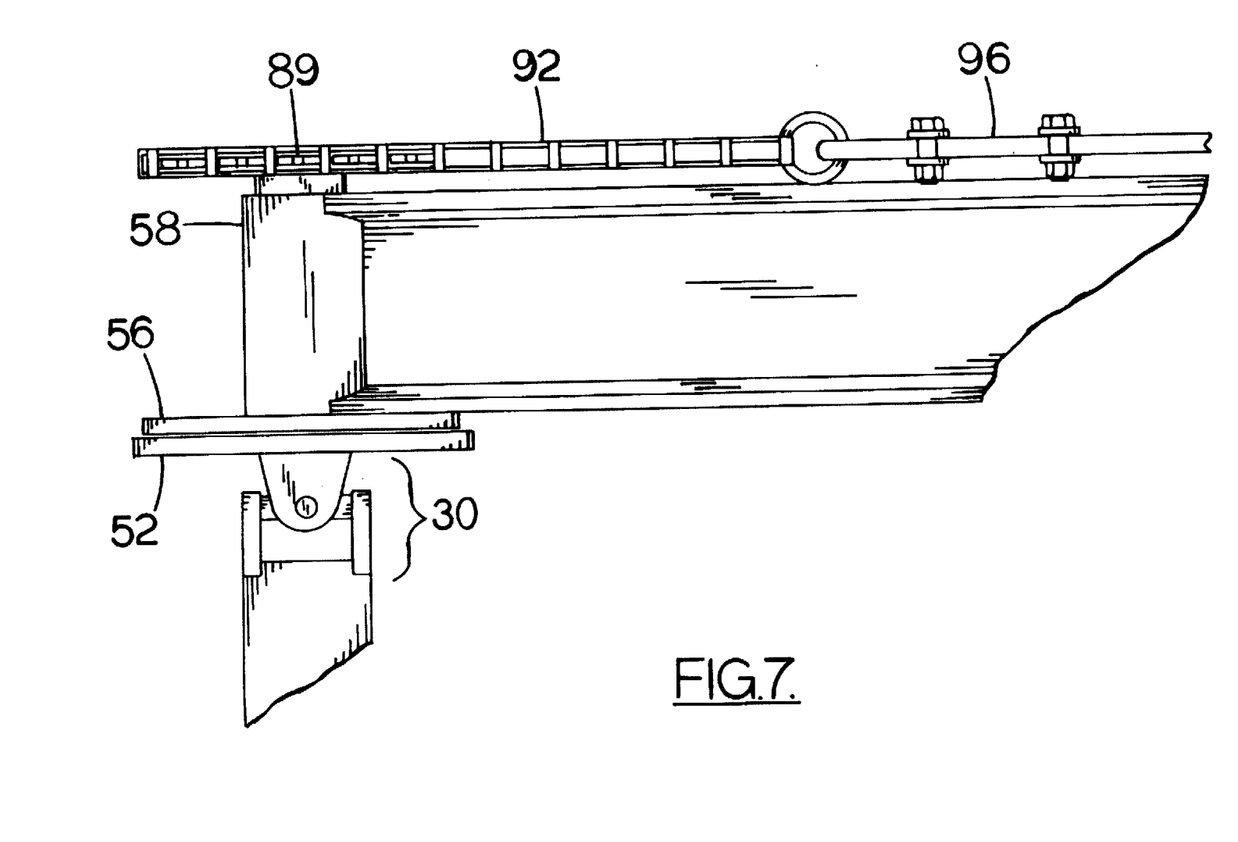
FIG. 7 is a partial view showing the pivot joint, top and bottom front twist plates, front tube, front sprocket gear and the main beam attached to the front tube.

A front tube 58 is rigidly attached to the top surface of the top front twist plate 56. The front tube 58 is a hollow tube with a top end, bottom end and perimeter side wall. The front tube 58 is rotatably installed over the front shaft 54 with the bottom end rigidly attached to the top surface of the front top twist plate 56. The height of the front tube is slightly greater then the height of the main beam and slightly less then the height of the front shaft 54. This allows the top end of the front shaft 54 to extend through the top end of the front tube 58. The front tube 58 must be rotatable about the front shaft 54.

The main beam 14 is rigidly attached to the side wall of the front tube 58. The main beam 14 is typically an "T" beam having a top, bottom, front end, rear end and center portion. However, square tubing can also be used and functions very well in this capacity. The length of the main beam must be long enough for there to be clearance of the implements during cornering and long enough for proper operation. In the preferred embodiments, the length of the main beam 14 will be approximately 15.5 feet. The front end of the main beam 14 is attached to the side wall of the front tube 58 such that the main beam 14 extends perpendicular from the front tube 58. Generally, the main beam 14 will be welded to the front tube 58. However, other configurations and other materials may require attachment in a different manner.

Figure 8:
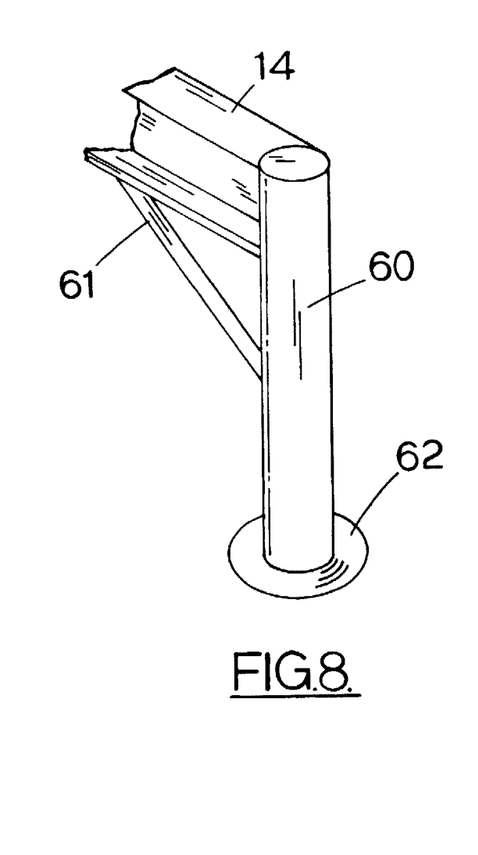
FIG. 8 is a representation of the main beam attached to the rear upright tube and the upper rear twist plate attached to the bottom of the rear upright tube.

A rear upright tube 60 is rigidly attached to the rear end of the main beam 14. The rear upright tube 60 will be in a spaced parallel relation with the front tube 58. The rear upright tube typically is a hollow tube having a top end, bottom end and side wall. The height of the rear upright tube 60 is determined by keeping the main beam nearly level when attached to a tractor. Therefore, the height will be approximately the height of the top of the front upright support 12 when attached to a tractor minus the height of the axle in the wheel and axle assembly 18. The main beam 14 will be attached to the side wall of the rear upright tube 60 in a perpendicular relationship. Typically, a height of the main beam 14 provides approximately 5.5 feet of clearance under the beam.

Additional support members 61 may be used between the rear upright tube 60 and the main beam 14. The support members 61 attached to the main beam and extends down to and are attached to the rear upright tube 60 to provide additional rigid support and structural strength to the self steering tandem hitch 10.

An upper rear twist plate 62 is rigidly attached to the bottom end of the rear upright tube 60. This twist plate resembles the front upper twist plate 56. The upper rear twist plate 62 has a center opening. The rear upright tube 60 attaches to the upper rear twist plate 62 such that the center opening corresponds to the hollow opening on the bottom end of the rear upright tube 60.

A rear shaft 64 fits within and is rotatable within the rear upright tube 60. The rear shaft 64 will have a height slightly greater then the height of the rear upright tube 60. The rear shaft 64 may be solid or hollow with a top end and bottom end. The top end of the rear shaft 64 must extend through the top end of the rear upright tube 60 and the bottom end of the rear shaft 64 extends through the bottom end of the rear upright tube 60.

Figure 9:
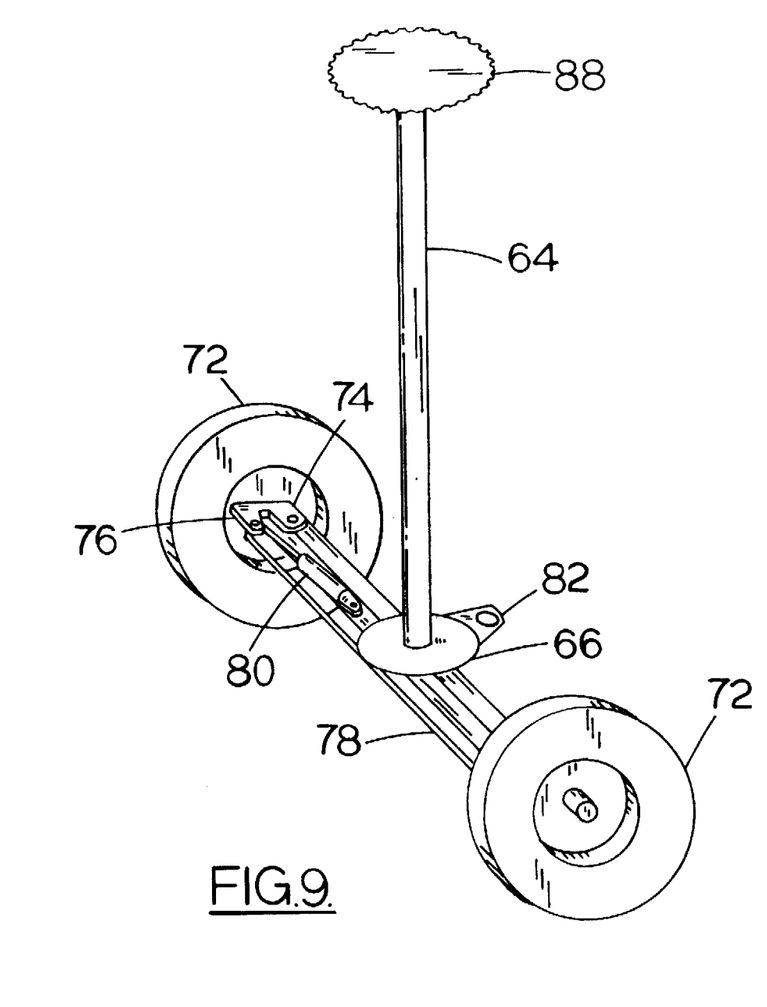
FIG. 9 illustrates the rear wheel assembly with the bottom rear twist plate, the rear shaft extending upward from the twist plate and the rear sprocket.

A bottom rear twist plate 66 is rigidly attached to the bottom end of the rear shaft 64. The bottom rear twist plate 66 has a top surface and bottom surface. The bottom surface of the upper rear twist plate 62 contacts and twists upon the top surface of the bottom rear twist plate 66. The total weight of the rear of the self steering tandem hitch 10 less the weight of the wheel and axle assembly 18 is carried on the twist plates 62 and 66.

The wheel and axle assembly 18 is rigidly attached to the bottom of the bottom rear twist plate 66. As the rear shaft 64 rotates within the rear upright tube 60 the wheel and axle assembly 18 will also rotate. This action provides the steering of the rear or second implement during cornering. The first steering apparatus 20 rotates the rear shaft 64 to rotate the wheel and axle assembly 18 during cornering or turning.

The wheel and axle assembly 18 are typical of those found in many other applications. The wheel and axle assembly 18 will have an axle cross member 68 extending to a wheel assembly 70 at each end. Each wheel assembly 70 will have a wheel 72 and a pivotly attached axle 74. This allows the wheels to pivot in respect to the axle cross member 68. In some wheel and axle assemblies the wheels may also lean off vertical when pivoting. The lean compensates for the pressures exerted on the wheel and axle assembly 18 when pulling an implement in an offset position. The pivoting of the wheels in respect to the axle cross member 68 provides the offset during pulling operations. Pivoting of the wheels in respect to the axle cross member 68 is accomplished with the second steering apparatus 22.

The second steering apparatus 22 consists of tie rods 76, cross link 78 and a hydraulic cylinder 80. The tie rods rigidly attach to the pivoting axles 74 for steering purposes. The cross link 78 connects the tie rods 76. The hydraulic cylinder is used to steer the wheels by pivoting the wheels in respect to the axle cross member 68. As indicated above this action provides steering to offset the rear or second implement.

An implement attachment means 82 must be used for attaching the implement to the wheel and axle assembly 18. In one embodiment, the implement attachment means 82 is typically a standard implement hitch attached in a fixed position on the axle cross member 68. In another embodiment, the implement attachment means consists of a sliding hitch, also designated as 82, attached to the axle cross member 68. The sliding hitch 82 provides attachment of a farm implement any point along axle cross member to provide additional offset for the implement. Typically, the implement attachment means can be bolted or welded to the wheel and axle assembly.

A stand 100 is also provided. The stand 100 supports the front of the self steering tandem hitch 10 when disconnected from a tractor. The stand 100 will hold front support 12 at a convenient height for attachment to the tractor. Typically, the stand 100 will be slidable through an opening in the main beam 14 approximately 18 inches from the front. The stand will be secured in an upright position during use and when connected to the tractor. The stand 100 would be locked and secured in a lower position when disconnected from the tractor.

The principle purpose of this invention is the self steering of the rear of the tandem hitch. This is accomplished by the first steering assembly 20. This assembly, in addition to parts already mentioned, contains a front sprocket 84, steering link 86 and rear sprocket 88.

The front sprocket 84 is rigidly attached to the top of the front shaft 54. Since the front shaft 54 and the whole front upright support 12 is held rigid to the tractor, the front sprocket 84 is also held rigid in respect to the tractor. It does not rotate in respect to the tractor. It may pivot atop the front shaft as the front shaft pivots about the pivot joint 30 to compensate for uneven terrain. Other than this pivoting action, the front sprocket 84 is rigidly fixed to the top end of the front shaft 54.

Since the front tube 58 rotates about the front shaft 54, the front tube rotates in respect to the front sprocket 84. Therefore, the main beam 14 attached to the front tube 58 rotates in respect to the front sprocket 84. This action provides the principle action required to steer the rear of the self steering tandem hitch 10. As the tractor turns, the front sprocket 84 turns with the tractor with the main beam rotating in respect to the front sprocket 84.

The rear sprocket 88 is rigidly attached to the top of the rear shaft 64. So that as the rear sprocket 88 rotates, the rear shaft 64 rotates which in turn rotates the wheel and axle assembly 18. The rear sprocket 88 has a predetermined gear ratio to the front sprocket 84. In the preferred embodiment the gear ratio is approximately 2 to 1. The rear sprocket having approximately 2 teeth per one tooth on the front sprocket. However, this ratio may change dependent on the specific dimensions of the main beam 14, type of implements, and other configuration.

The steering link 86 connects the front sprocket 84 to the rear sprocket 88. As the tractor turns, the front sprocket turns with the tractor. The main beam of the self steering tandem hitch has the tendency to pivot. The action of the turning tractor and the tendency of the rear of the self steering tandem hitch 10 to maintain original travel direction causes the front sprocket 84 to rotate in respect to the main beam 14. This causes the steering link 86, engaged on the front sprocket 84, to rotate the rear sprocket 88. This will rotate the wheel and axle assembly 18 to steer the rear of the self steering tandem hitch 10 to compensate for the over swing or under swing of the rear or second implement.

Figure 1:
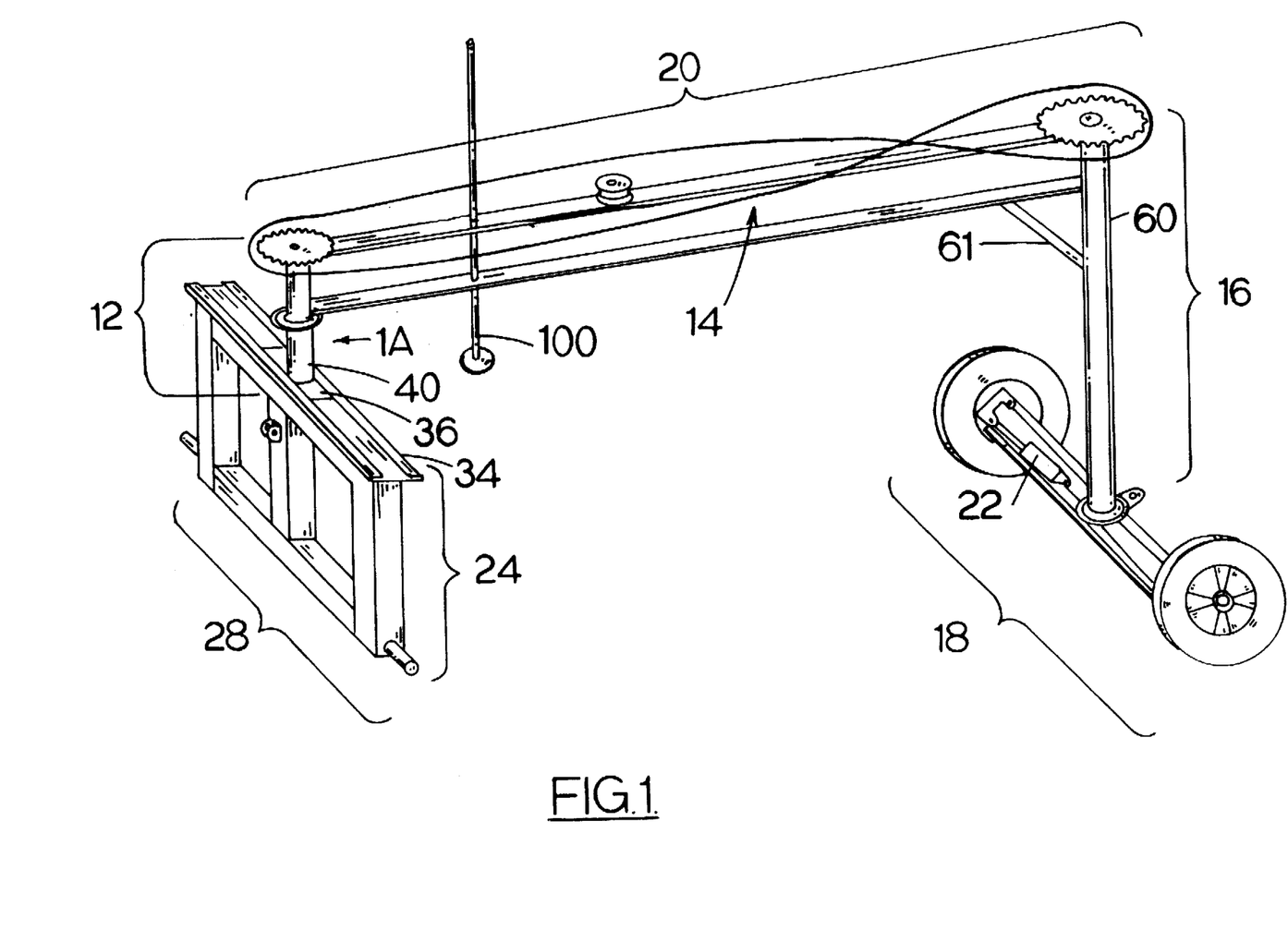
FIG. 1 is an isometric view of the self steering tandem hitch with the offset hookup device.
Figure 1A:
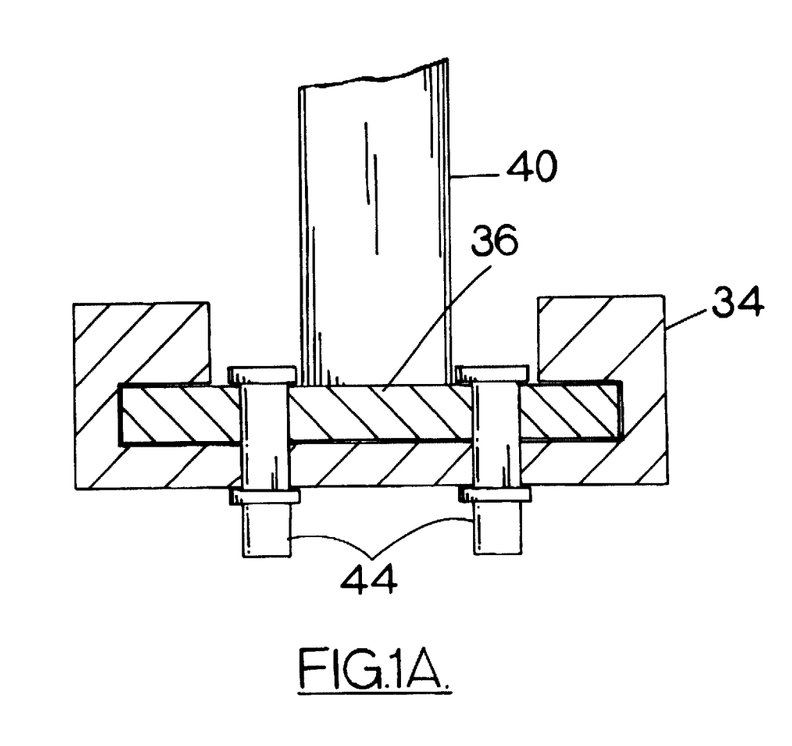
FIG. 1A is a sectional view of a portion of the receiver shown on FIG. 1.
Figure 2:
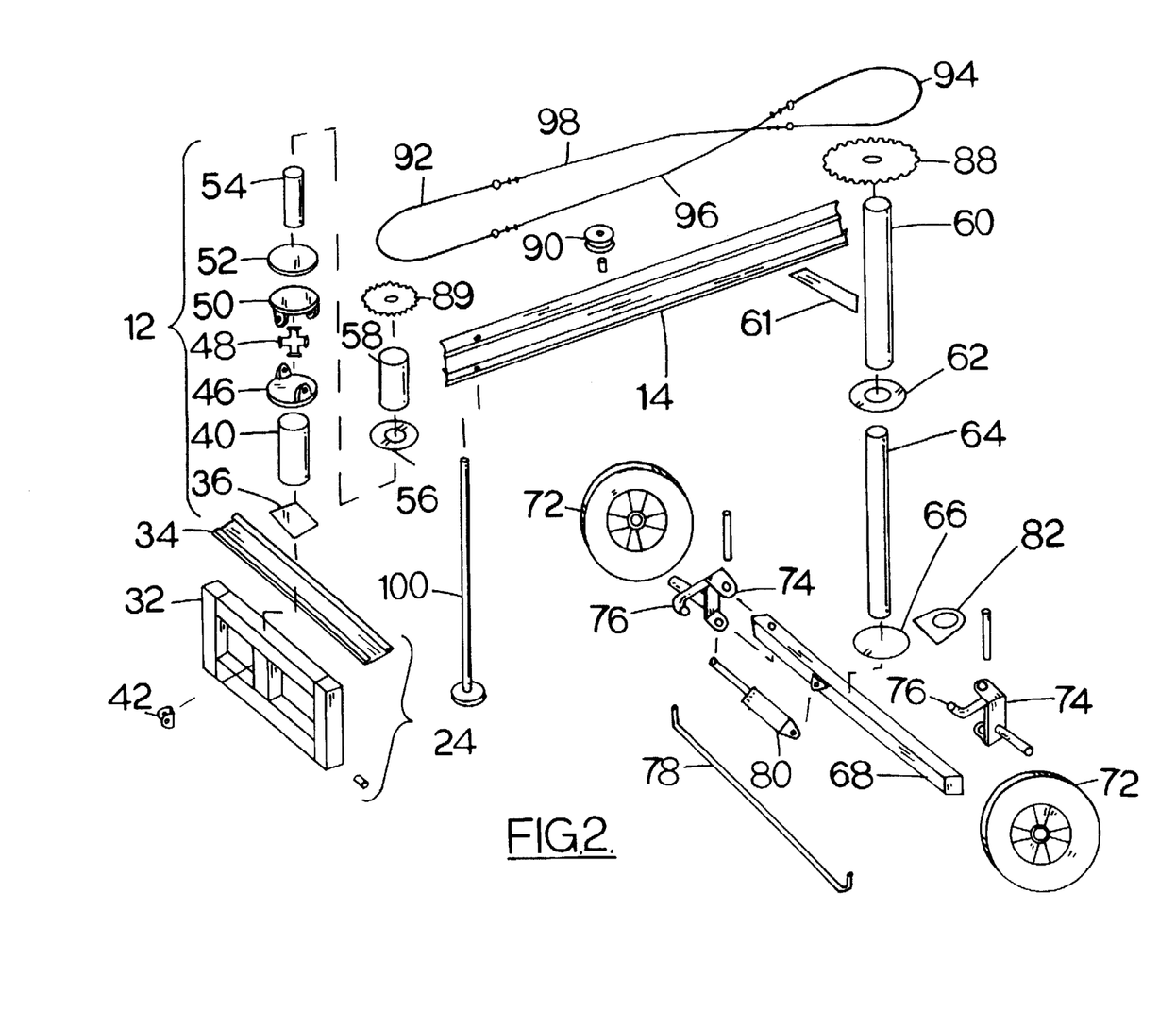
FIG. 2 is an exploded isometric view of the self steering tandem hitch with the offset hookup device.
Figure 3:
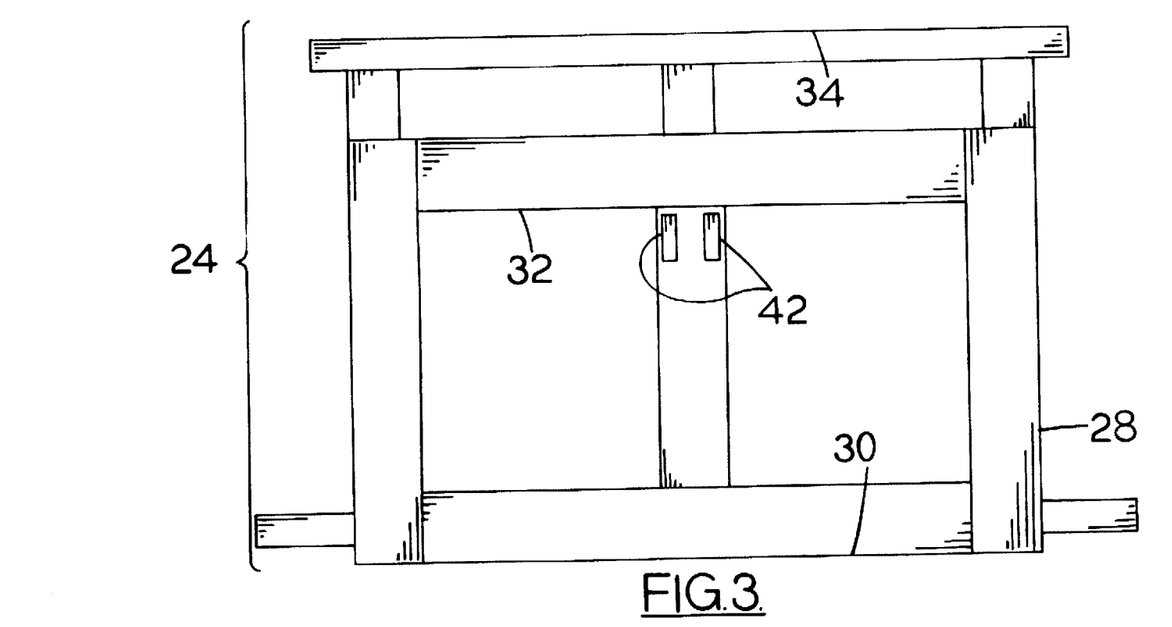
FIG. 3 is a front view of the offset hook up device.
Figure 4:
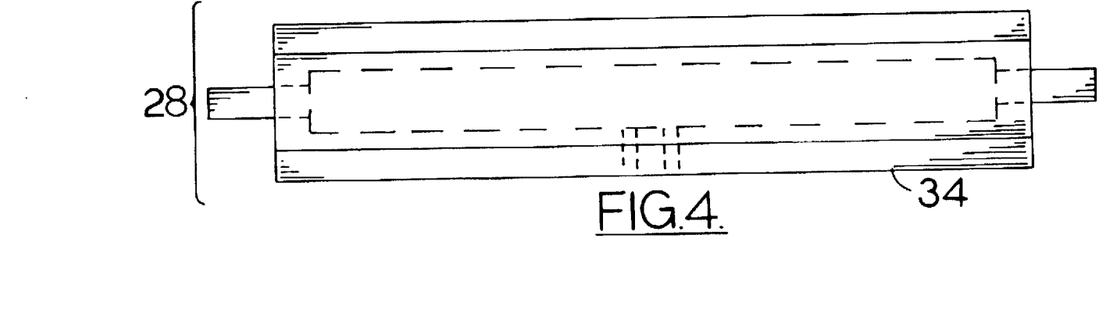
FIG. 4 is a top view of the offset hookup device.

The first steering apparatus 20 is configured to rotate the rear sprocket 88 in an opposite direction of the front sprocket 84. To do this the steering link is typically crossed between the front sprocket 84 and rear sprocket 88. This is shown in FIGS. 1 and 2. An idle pulley 90 may also be used to prevent entanglement of the steering link 86 and to help cross the steering link 86.

In one embodiment, the steering link 20 consists of two chains 92 and 94 and two cables 96 and 98. The typical configuration for this embodiment will be one end of the first cable 96 attached to one end of the first chain 92. The second chain 94 is attached to the other end of the first cable 96. The second cable 98 is attached to the other end of the second chain 94 with the other end of the second cable 98 being attached to the free end of the first chain 92. This forms a continuous steering link 20 as illustrated in FIG. 2. This configuration also provides adjustments to the steering link as the steering link stretches under use. A continuous chain, cable or belt could also be used as well as a mechanical connection using shafts, gears or other mechanical means without departing from the scope and spirit of the invention herein disclosed.

As described, this invention provides a self steering tandem hitch that automatically steers a second or rear implement so it will properly trail the first implement around corners. Without the automatic steering the second implement would over swing or under swing leaving an area untouched. The steering action accomplished by this device steers the second implement to give a true and correct trailing of the second implement.

Having described the invention in detail, those skilled in the art will appreciate that modifications may be made of the invention without departing from the spirit of the inventive concept herein described.

Therefore, it is not intended that the scope of the invention be limited to the specific and preferred embodiments illustrated and described. Rather, it is intended that the scope of the invention be determined by the appended claims and their equivalents.

What is claimed is:

1. A self steering tandem hitch comprising:

a first upright support shaft having a top end and a bottom end, said first upright support having an attachment device attachable to a tractor;

a pivot joint attached to said top end of said first upright support shaft;

a front bottom twist plate having a top surface and bottom surface, said bottom surface attached to said pivot joint;

a front shaft having a bottom end and a top end, said bottom end attached to a center area of said top surface of said front bottom twist plate, said front shaft extending upward in an inline parallel alignment with said first upright support;

a front top twist plate having a center opening, top surface and a bottom surface that rests and rotates upon said top surface of said front bottom twist plate, said front shaft extending through said center opening on said front top twist plate;

a front tube having a top end, bottom end and side wall, said front tube installed over said front shaft with said bottom end rigidly attached to said top surface of said front top twist plate, said top end of said front shaft extending through said top end of said front tube, said front tube rotatable about said front shaft;

a main beam having a front end, rear end and center portion, said front end attached to said side wall of said front tube, said main beam extending perpendicular from said front tube;

a rear upright tube having a top end, bottom end and side wall, said side wall of said rear upright tube attached to said rear end of said main beam in a perpendicular relationship;

an upper rear twist plate rigidly attached to said bottom end of said rear upright tube, said upper rear twist plate having a center opening and a bottom surface;

a rear shaft insertable into and rotatable within said rear upright tube, said rear shaft having a top end and bottom end, said top end of said rear shaft extending through said top end of said rear upright tube and said bottom end of said rear shaft extending through said bottom end of said rear upright tube;

a bottom rear twist plate rigidly attached to said bottom end of said rear shaft, said bottom rear twist plate having a top surface and bottom surface, said top surface contacts and rotates upon said bottom surface of said upper rear twist plate;

an axle having wheels rigidly attached to said bottom surface of said bottom rear twist plate, said axle being rotatable in respect to said main beam by said rear shaft rotating within said rear upright tube;

an attachment means on said axle for attachment of a second farm implement;

a steering device attached to said axle to pivot said wheels on said axle in respect to said axle to cause a rear end of said self steering tandem hitch to maintain a left or right offset position, amount of said offset being determined by amount of pivot of said wheel in respect to said axle;

a front sprocket rigidly fixed to said top end of said front shaft, said front sprocket being rotated in respect to said main beam as the tractor on which said self steering tandem hitch is being used negotiates turns, said front sprocket being non-rotatable in respect to the tractor;

a rear sprocket rigidly fixed to said top end of said rear shaft, said rear sprocket having a predetermined gear ratio to said front sprocket, said rear shaft and said axle rotate as said rear sprocket rotates; and a steering apparatus around and joining said front sprocket and said rear sprocket, said steering apparatus configured to rotate said rear sprocket in an opposite direction of said front sprocket as said front sprocket rotates thereby maintaining alignment of said second farm implement to a first farm implement attached to the tractor as the tractor negotiates turns and corners.

2. The self steering tandem hitch as set forth in claim 1 in which said attachment device comprises an inverted T attachment device, said inverted T attachment device attached to a lower end of said first upright support and adapted to attach said self steering tandem hitch to a three point hitch on a tractor.

3. The self steering tandem hitch as set forth in claim 1 in which said attachment device comprises an offset hookup device attachable to a tractor's three point hitch, said offset hookup device comprising a frame member supporting a top cross member, a multi-position receiver on the top of said top cross member, and a hookup plate, said hookup plate rigidly attached a lower end of said first upright support, said hookup plate being attachable to said multi-position receiver in any one of a plurality of positions to provide an offset of an implement attached to said self steering tandem hitch.

4. The self steering tandem hitch as set forth in claim 3 in which said multi-position receiver further comprises a channel on which said hookup plate may slide, said hookup plate being secured at any position along said channel.

5. The self steering tandem hitch as set forth in claim 1 in which said pivot joint comprises a standard universal joint with attachment means.

6. The self steering tandem hitch as set forth in claim 1 in which said pivot joint comprises a yoke rigidly attached to said top end of said first upright support, a pivot pin rotatably installed in said yoke and a second yoke rigidly attached to said bottom surface of said front top twist plate, said second yoke being pivotally attached to said pivot pin.

7. The self steering tandem hitch as set forth in claim 1 in which said attachment device on said axle is a standard implement hitch attached in a fixed position on said axle.

8. The self steering tandem hitch as set forth in claim 1 in which said attachment device on said axle comprises a sliding hitch attached to said axle, said sliding hitch providing attachment of a farm implement any point along said sliding hitch to provide an offset for the implement.

9. The self steering tandem hitch as set forth in claim 1 further comprising additional support members, said support members attached to said main beam and extends down to and are attached to said rear upright tube to provide additional rigid support and structural strength to said self steering tandem hitch.

10. The self steering tandem hitch as set forth in claim 1 in which said steering device on said axle comprises pivot means for each wheel on said axle to allow said wheels to pivot in respect to said axle, tie rods attached to each pivot means, a cross link pivotally attached to and connecting said tie rods and a control device attached to said axle and to said cross link, said control device controlling travel position of said cross link in respect to said axle, said wheels pivot as said cross link travels.

11. The self steering tandem hitch as set forth in claim 10 in which said control device comprises a hydraulic cylinder.

12. The self steering tandem hitch as set forth in claim 10 in which said control device comprises a receiving plate having a plurality of holes attached in a parallel relationship to said axle, a second plate having plurality of holes attached to said cross link, and a locking pin, said locking pin extending through one of said holes on said second plate and one of said holes on said receiving plate to lock said cross link in a fixed position in respect to said axle.

13. The self steering tandem hitch as set forth in claim 1 in which said steering apparatus comprises a first chain, a first cable attached to one end of said first chain, a second chain attached to the other end of said first cable, a second cable attached to the other end of said second chain with the other end of said second cable being attached to a free end of said first chain to form a continuous chain/cable line, and a center idler pulley attached to said center portion of said main beam, said first chain interacting with teeth on said front sprocket, said second chain interacting with teeth on said rear sprocket, said chain/cable line being crossed at a point between said front sprocket and said rear sprocket to rotate said sprockets in opposite directions, said chain/cable line riding within said idle pulley to prevent entanglement of said chain/cable line.

14. A self steering tandem hitch comprising:
 a front upright support having a top end and a bottom end, said bottom end being attachable to a tractor;
 a main beam having a front end and rear end, said front end pivotally and rotatably attached to said top end of said front upright support;
 a rear upright support having an upper end and a lower end attached to said rear end of said main beam;
 an axle assembly rotatably attached to said lower end of said rear upright support, said axle assemble having wheels pivotally attached to said axle assembly;
 a first steering apparatus rotating said axle assembly in respect to said main beam as the tractor negotiates corners and turns to maintain alignment of a second farm implement attached to a rear end of said self steering with a first farm implement attached to the tractor;
 a second steering apparatus for pivoting said wheels in respect to said axle assembly to provide and maintain said rear end of said self steering tandem hitch in a left or right offset position.

15. The self steering tandem hitch as set forth in claim 14 in which said first steering device comprises;
 a front sprocket fixed in respect to said front upright support so that said main beam rotates in respect to said front sprocket;
 a rear sprocket fixed to said axle assembly so that as said rear sprocket rotates in respect to said main beam said axle assembly rotates in respect to said main beam; and
 a steering link connecting said front sprocket and said rear sprocket so that as said main beam rotates about said front upright support said rear sprocket rotates to rotate said axle assembly.

16. The self steering tandem hitch as set forth in claim 14 in which said second steering apparatus comprises a hydraulic cylinder, tie rods and cross link attached to the axle assembly to pivot and hold said wheels in a fixed position.

17. The self steering tandem hitch as set forth in claim 14 further comprising a stand, said stand extending through an opening in said main beam, said stand being lockable in an upper position for an in-use position and a lower position to support said self steering tandem hitch when disconnected from a tractor.

18. A self steering tandem hitch comprising:
 a front upright support having a top end and a bottom end, said bottom end being attachable to a tractor;
 a main beam having a front end and rear end, said front end pivotally and rotatably attached to said top end of said front upright support;

a rear upright support having an upper end and a lower end attached to said rear end of said main beam;

an axle assembly rotatably attached to said lower end of said rear upright support, said axle assemble having wheels pivotally attached to said axle assembly;

a first steering apparatus comprising a front sprocket fixed in respect to said front upright support so that said main beam rotates in respect to said front sprocket, a rear sprocket fixed to said axle assembly so that as said rear sprocket rotates in respect to said main beam said axle assembly also rotates in respect to said main beam, and a steering line connecting said front sprocket and said rear sprocket so that as said main beam rotates about said front upright support said rear sprocket rotates to rotate said axle assembly to maintain alignment of a second farm implement attached to a rear end of said self steering with a first farm implement attached to the tractor;

a second steering apparatus comprising a hydraulic cylinder, tie rods and cross link attached to the axle assembly to pivot and hold said wheels in a fixed position and to provide and maintain said rear end of said self steering tandem hitch in a left or right offset position.

* * * * *